(12) United States Patent  
Lehtovirta et al.

(10) Patent No.: US 7,715,837 B2
(45) Date of Patent: May 11, 2010

(54) METHOD AND APPARATUS FOR RELEASING CONNECTIONS IN AN ACCESS NETWORK

(75) Inventors: Vesa Lehtovirta, Espoo (FI); Alain Maupin, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1548 days.

(21) Appl. No.: 09/778,960

(22) Filed: Feb. 8, 2001

(65) Prior Publication Data

US 2001/0034228 A1 Oct. 25, 2001

Related U.S. Application Data

(60) Provisional application No. 60/184,327, filed on Feb. 23, 2000, provisional application No. 60/183,325, filed on Feb. 18, 2000.

(51) Int. Cl.
*H04Q 7/20* (2006.01)
*G06F 15/16* (2006.01)
*H04L 12/66* (2006.01)

(52) U.S. Cl. ............... 455/424; 455/225; 709/227; 370/352

(58) Field of Classification Search .......... 370/401, 370/228, 245, 244, 225, 242, 243, 352–354, 370/338, 332, 236.1, 349, 217–218, 219, 370/220, 221, 216, 277, 310, 312, 317, 346; 455/408, 424, 226.1, 67.11, 422, 423, 414.1, 455/510, 558, 421, 453, 8, 41.2, 9, 10, 504, 455/506, 41.225; 702/170, 122, 107, 120; 714/2, 3, 6, 15, 10, 11, 12, 23, 25, 47; 709/227–228
See application file for complete search history.

(56) References Cited

U.S. PATENT DOCUMENTS 5,612,992 A 3/1997 Dupuy et al.

(Continued)

FOREIGN PATENT DOCUMENTS

DE 4415565 11/1995

(Continued)

OTHER PUBLICATIONS

*3G TS 25.413 v3.1.0 Technical Specification*, Mar. 2000, 3$^{rd}$ Generation Partnership Project; Technical Specification Group Radio Access Network; UTRAN Iu Internace RANAP Signalling (Release 1999).

(Continued)

*Primary Examiner*—George Eng
*Assistant Examiner*—Khawar Iqbal
(74) *Attorney, Agent, or Firm*—Nixon & Vanderhye P.C.

(57) ABSTRACT

Plural communication connections are established between an external network and subscriber units by way of a an access network. The subscriber unit connection is supported by plural nodes. When a failure is detected in a node, those subscriber unit connections affected by that failure are identified. A message identifying those subscriber unit connections affected by the failure is sent to one or more other nodes. Affected subscriber unit connections identified in the message are released. Those unaffected connections not included in the message are maintained.

36 Claims, 11 Drawing Sheets

U.S. PATENT DOCUMENTS

| | | | |
|---|---|---|---|
| 6,178,327 B1 * | 1/2001 | Gomez | 455/445 |
| 6,408,182 B1 * | 6/2002 | Davidson et al. | 455/433 |
| 6,456,858 B1 * | 9/2002 | Streter | 455/552.1 |
| 6,522,987 B1 * | 2/2003 | Flink et al. | 702/122 |
| 6,631,122 B1 * | 10/2003 | Arunachalam et al. | 370/332 |
| 6,643,512 B1 * | 11/2003 | Ramaswamy | 455/435.1 |
| 6,643,607 B1 * | 11/2003 | Chamberlain et al. | 702/170 |
| 6,763,112 B1 * | 7/2004 | Haumont | 380/247 |
| 6,766,168 B1 * | 7/2004 | Lim | 455/435.1 |
| 6,775,542 B1 * | 8/2004 | Vilander et al. | 455/424 |
| 6,810,247 B1 * | 10/2004 | Halpern | 455/423 |
| 7,050,799 B2 * | 5/2006 | Menon et al. | 455/426.2 |
| 2002/0191573 A1 * | 12/2002 | Whitehill et al. | 370/338 |
| 2003/0169725 A1 * | 9/2003 | Ahmavaara et al. | 370/352 |
| 2003/0179712 A1 * | 9/2003 | Kobayashi et al. | 370/249 |
| 2007/0298804 A1 * | 12/2007 | Tamura et al. | 455/437 |

FOREIGN PATENT DOCUMENTS

| | | | |
|---|---|---|---|
| EP | 0 221 274 | * | 7/1992 |
| WO | 94/19878 | | 9/1994 |
| WO | 97/22054 | * | 6/1997 |

OTHER PUBLICATIONS

Official action, Mar. 28, 2006, in corresponding EP Application No. 01 908 532.3.

* cited by examiner

METHOD AND APPARATUS FOR RELEASING CONNECTIONS IN AN ACCESS NETWORK

RELATED PRIORITY APPLICATIONS

This application claims priority from commonly-assigned U.S. Provisional Patent Application Ser. No. 60/184,327, filed on Feb. 23, 2000 and commonly-assigned U.S. Provisional Patent Application Ser. No. 60/183,325, filed on Feb. 18, 2000, both of which are entitled "Method and Apparatus for Releasing Radio Access Bearers In A Radio Access Network," the disclosures of which are incorporated herein by reference.

FIELD OF THE INVENTION

The present invention relates to radio communication networks and other communication networks, where a subscriber unit, e.g., a mobile radio station, may employ several simultaneous connections to the network.

BACKGROUND AND SUMMARY OF THE INVENTION

Mobile communications have developed from first generation, analog-based mobile radio systems to second generation digital systems, such as the European Global System for Mobile communications (GSM). Current developments for a third generation of mobile radio communication include the Universal Mobile Telephone communications System (UMTS) and the IMT 2000 system. For simplicity, third generation systems are referred to simply as UMTS. In simple terms, UMTS is "communication to everyone, everywhere," where communication also includes providing information using different types of media, i.e., multimedia communications.

Second generation mobile/cellular telecommunications networks are typically designed to connect and function with Public Switched Telephone Networks (PSTNs) and Integrated Services Digital Networks (ISDNs). Both of these networks are circuit-switched networks (rather than packet-switched) and handle relatively narrow bandwidth traffic. However, packet-switched networks, such as the Internet, are very much in demand and handle much wider bandwidth traffic than circuit-switched networks. While wireline communication terminals, e.g., personal computers, are capable of utilizing the wider packet-switched network bandwidth, wireless user equipment units (UEs) are at a considerable disadvantage because of the limited bandwidth of the radio/air interface between UEs and packet-switched networks.

UEs are currently limited in the data rates for data communications services such as facsimile, electronic mail, and Internet. The demand is growing for higher data transfer speeds in order the "surf the net" using UEs with fast access to text, images, and sound. Multimedia applications demand high peak bit rates in short bursts, particularly when information is downloaded to the UE. Another challenging multimedia UE application is simultaneous voice and data, e.g., PC application sharing or shared whiteboard. Although this latter type of multimedia application may not require particularly high bit rates, it does require real time, continuous operation because of the voice content. A demanding circuit-switched application (rather than packet-switched as in the Internet application) requiring relatively high bit rates is video conferencing. In order for mobile video conferencing to become practical, the amount of user bandwidth required must be reduced to a minimum without sacrificing image quality.

A UMTS Wideband-Code Division Multiple Access (WCDMA) radio access network provides wireless access at very high data rates and supports enhanced services not realistically attainable with the first and second generation mobile communication systems. WCDMA currently supports 5 MHz-15 MHz, and in the future, promises an even greater bandwidth. In addition to wide bandwidth, WCDMA also improves the quality of service by providing robust operation in fading environments and transparent ("soft") handoffs between base stations. Multipath fading is used to advantage to enhance quality, i.e., using a RAKE receiver and improved signal processing techniques, contrasted in narrowband systems where fading substantially degrades signal quality.

A UMTS Terrestrial Radio Access Network (UTRAN) responds to radio access service requests by allocating resources needed to support a communication with a UE. The UTRAN includes plural base stations for communicating with UEs over a radio air interface using radio channel resources allocated by a radio network controller connected to the base stations. External network service nodes that interface with external networks, communicate with UEs via the UTRAN. When one of the service nodes requires communication with a UE, the service node requests a radio access "bearer" (RAB) from the UTRAN rather than a specific radio channel resource. A radio access bearer is a logical connection with the UE through the UTRAN and over the radio air interface and corresponds to a single data stream. For example, one radio access bearer may support a speech connection, another bearer may support a video connection, and a third bearer may support a data packet connection. Each radio access bearer is associated with quality of service (QoS) parameters describing how the UTRAN should handle the data stream. Examples of quality of service parameters include data rate, variability of data rate, amount and variability of delay, guaranteed vs. best effort delivery, error rate, etc. Although the term "radio access bearer" is sometimes used for purposes of the following description, the invention applies to any type of "connection," and is not limited to logical connections like RABs, a particular type of physical connection, etc.

Radio access bearers are dynamically assigned to UTRAN transport and radio channel resources by the UTRAN. The radio access bearer service and the UTRAN isolate the details of transport and radio resource allocation handling as well as details of radio control, e.g., soft handoff. The UTRAN approach is different from traditional approaches where an external network and/or an external network service node is involved in the details of requesting, allocating, and controlling specific radio connections to and from the mobile radio. Instead, the external network service node only needs to request a radio access bearer service over a RAN interface to the UTRAN along with a specific quality of service for a communication to a specific mobile radio. The UTRAN provides the requested service at the requested quality of service (if possible).

Plural radio access bearers may be established and released independently to one UE including bearers from different networks. Moreover, plural radio access bearers, e.g., one carrying circuit-switched information and another carrying packet-switched information, intended for the specific UE may be multiplexed onto the same CDMA channel. Each bearer may have its own transport connection through the UTRAN, or it may be multiplexed with other bearers onto one transport connection.

To initiate a radio access bearer service, a request is transmitted to the UTRAN for communication with a UE. One or more parameters accompany the radio access bearer service request. When establishing each bearer, the UTRAN "maps" or allocates the radio access bearer to physical transport and radio channel resources through the UTRAN and over the radio air interface, respectively. The transport connection between nodes in the UTRAN may be for example an ATM type connection. A radio channel over the air interface includes one or more CDMA spreading codes.

The mapping is based on the one or more parameters associated with the radio access bearer service request. In addition to quality of service parameters, the parameters may also include one or more traffic condition parameters like a congestion level on a common channel, an interference level in the geographic location area in which the UE is currently operating, a distance between the UE and the base station, radio transmit power, the availability of dedicated channel resources, the existence of a dedicated channel to a UE, and other traffic parameters or conditions.

An example Universal Mobile Telecommunications System (UMTS) 10 is shown in FIG. 1. A representative, core network 16, includes a circuit-switched core network (CS CN), shown as box 18, and a packet-switched core network (PS CN), shown as box 20. The circuit-switched core network includes nodes, e.g., Mobile Switching Centers (MSC) 18, Home Locations Register (HLR), Gateway MISC (GMSC), etc., that provide circuit-switched services. The packet-switched core network includes nodes, e.g., Serving GPRS Support Nodes (SGSN) 20, Gateway GPRS Support Node (GGSN), HLR, etc., that are tailored to provide packet-switched services. The CSCN 18 is coupled to an external circuit-switched network 12, such as the Public Switched Telephone Network (PSTN) or the Integrated Services Digital Network (ISDN). The packet-switched core network 20 is coupled to an external packet-switched network 14, such as the Internet.

Each of the core networks 18 and 20 is coupled to a UMTS Terrestrial Radio Access Network (UTRAN) 22 that includes one or more Radio Network Controllers (RNCs) 26. Each RNC is coupled to a plurality of base stations (BSs) 28 and to other RNCs in the UTRAN 22. Each base station 28 corresponds to one access point (one sector or cell) or includes plural access points. Radio communications between one or more base station access points and wireless user equipment unit (UE) 30 are by way of a radio interface. Radio access in this non-limiting example is based on Wideband-CDMA (W-CDMA) with individual radio channels distinguished using spreading codes. Wideband-CDMA provides wide radio bandwidth for multi-media services including packet data applications that have high data rate/bandwidth requirements.

FIG. 2 illustrates an example where a UE has four simultaneous radio access bearers (RABs) with core networks via the UTRAN: one RAB towards the CSCN 18, and three RABs towards the PSCN 20. For simplicity only a single RNC 26 is shown in FIG. 2. In this example, RAB#1 could be used for a speech call, RAB#2 for web browsing, RAB#3 for downloading files with file transfer protocol (FTP), and RAB#4 for sending electronic mail.

UMTS network nodes, such as BSs, RNCs, MSCs, GPRS nodes, etc., may employ a modular and distributed architecture where several processor boards are coupled to a switch. Referring to the generic node 40 in FIG. 3, there may be several processors 44 on each processor board 42. The processors 44 communicate via the switch 46. The switch could be, for example, an ATM-type switch. Further details of such an architecture are described, for example, in commonly-assigned, co-pending application Ser. No. 09/039,453 entitled, "Asynchronous Transfer Mode Platform for Mobile Communications," filed on Mar. 16, 1998, the disclosure of which is incorporated herein by reference. Each processor 44 may include a self-detecting failure mechanism with one or more hardware detectors and/or software error detection algorithms.

When a connection, such as a radio access bearer (RAB), is established through a network node, a processor is allocated to handle the connection. FIG. 4 shows how four RABs of a UE 30 could be allocated to different processors in an RNC node 26 and a PSCN node 20. For simplicity, only the RABs of one UE 30 are shown, and the base station node is omitted. RAB#1 is handled by processor 1 on processor board C and by CS CN (for which details are omitted). RABs#2 is handled by processor 2 on processor board C and by processor 1 on processor board A. RAB#3 is handled by processor 2 on processor board C and by processor 3 on processor board B. RAB#4 is handled by processor 4 on processor board D and by processor 4 on processor board B.

It is not uncommon for failures of some sort to occur in a node. The whole node or only a part of the node may fail. If the whole node fails, all connections through the node are lost. Consider the example depicted in FIG. 4 where there is a complete failure of the PSCN node 20. As a result, RAB#2, RAB#3, and RAB#4 are lost. However, RAB#1 survives because it is not using the failed PSCN node 20. A partial failure may affect only one device or board, while other devices or boards remain fully operational. An example of a partial failure is when a processor 44 or a processor board 42 crashes or is restarted. In FIG. 4, if processor board C in the RNC 26 fails, RAB#1, RAB#2, and RAB#3 are lost. However, RAB#4 survives because RAB#4 is not supported by the failed processor board C. If processor 3 in board B in the PSCN node 20 experiences a restart, RAB#3 is lost, but other RABs supported by board B survive, including RAB#4 to processor 4.

When a connection is lost in a node due to a failure of some sort, other nodes assigned to support that connection may not detect that the connection has actually been lost. Unless those other nodes are informed, the unreleased connection and associated supporting resources remain reserved for the connection, even though they are not being used. In the example shown in FIG. 5, if processor board C in the RNC 26 fails, RAB#1, RAB#2, and RAB#3 are lost. However, RAB#4 survives because RAB#4 is not using the failed processor board C. The RNC 26 should therefore instruct the CSCN 18 to release RAB#1. The RNC should also instruct the PSCN 20 to release RAB#2 and RAB#3. However, RAB#4 need not be released because it was not affected by the failure. In fact, RAB#4 should not be released if it carries a service independent of the other RABs.

Accordingly, it is desirable to selectively release resources affected by a partial failure in a node, while allowing unaffected node elements, connections, and resources to remain intact and functioning. There are different approaches to achieving these ends. Preferably, those approaches should be easily implemented in existing systems, e.g., using messages already-defined by or consistent with UTRAN standard signaling protocols.

The present invention meets the above-identified objectives. Initially, communication connections are established between an external network and subscriber units (e.g., wire-line telephones, wireless UEs, etc.) by way of an access network. The networks may provide wireline service, wireless service, or both. As described earlier, a connection includes any type of logical or physical communications connection that corresponds to a single information stream. A subscriber unit may employ one or plural communication connections. The subscriber unit connection is supported by plural nodes. When a failure is detected in a node, those subscriber unit connections affected by that failure are determined. A failure may include a complete failure in a node, a partial failure in a node, failure in one of several devices in a node, or any other incident that would impact the ability of that node to support a subscriber connection. A message identifying those affected subscriber unit connections is sent to one or more other nodes. Affected subscriber unit connections identified in the message are released. However, those unaffected connections not included in the message are maintained.

In an example embodiment, a list is generated that identifies the subscriber units affected by the detected failure along with the connections affected by the failure. This list is included in the message sent to one or more other nodes supporting a connection of identified subscriber unit connections. In the example context of a radio communications system like UMTS, the node in which the failure is detected may be any one of an external network node, a core network node, a radio access network node such as an RNC or a base station, or a UE.

In another example implementation of the present invention, network addresses, e.g., IP addresses, are assigned to devices in the node. When a subscriber unit connection is established, an address for each device associated with the subscriber unit connection is sent to other nodes. If a failure is detected in one of the devices, a message including the network address of the failed device is sent to one or more other nodes. For nodes containing plural processor boards coupled by a switch, where each processor board includes plural processors, such a message may identify the addresses of the plural processors on a failed board. As a result, the node(s) receiving the message release subscriber unit connections associated with that failed processor board.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not necessarily to scale or comprehensive, emphasis instead being placed upon illustrating the principles of the invention.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the following description is in the context of a downlink example from the radio network to wireless user equipment. Those skilled in the art will appreciate that the present invention may also be implemented in the opposite, uplink direction. Moreover, while the present invention finds advantageous application to and is described in the context of a radio communications environment, the invention may also be used in a wireline network environment. In such a wireline network application, the subscriber units would be wireline subscriber units and the access network would be a wireline access network interfacing the subscriber units and other networks such as Internet Service Provider (ISP) networks, the Internet, the PSTN, the ISDN, etc.

In some instances, detailed descriptions of well-known methods, interfaces, devices and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an Application Specific Integrated Circuit (ASIC), and/or using one or more Digital Signal Processors (DSPs).

Figure 6:
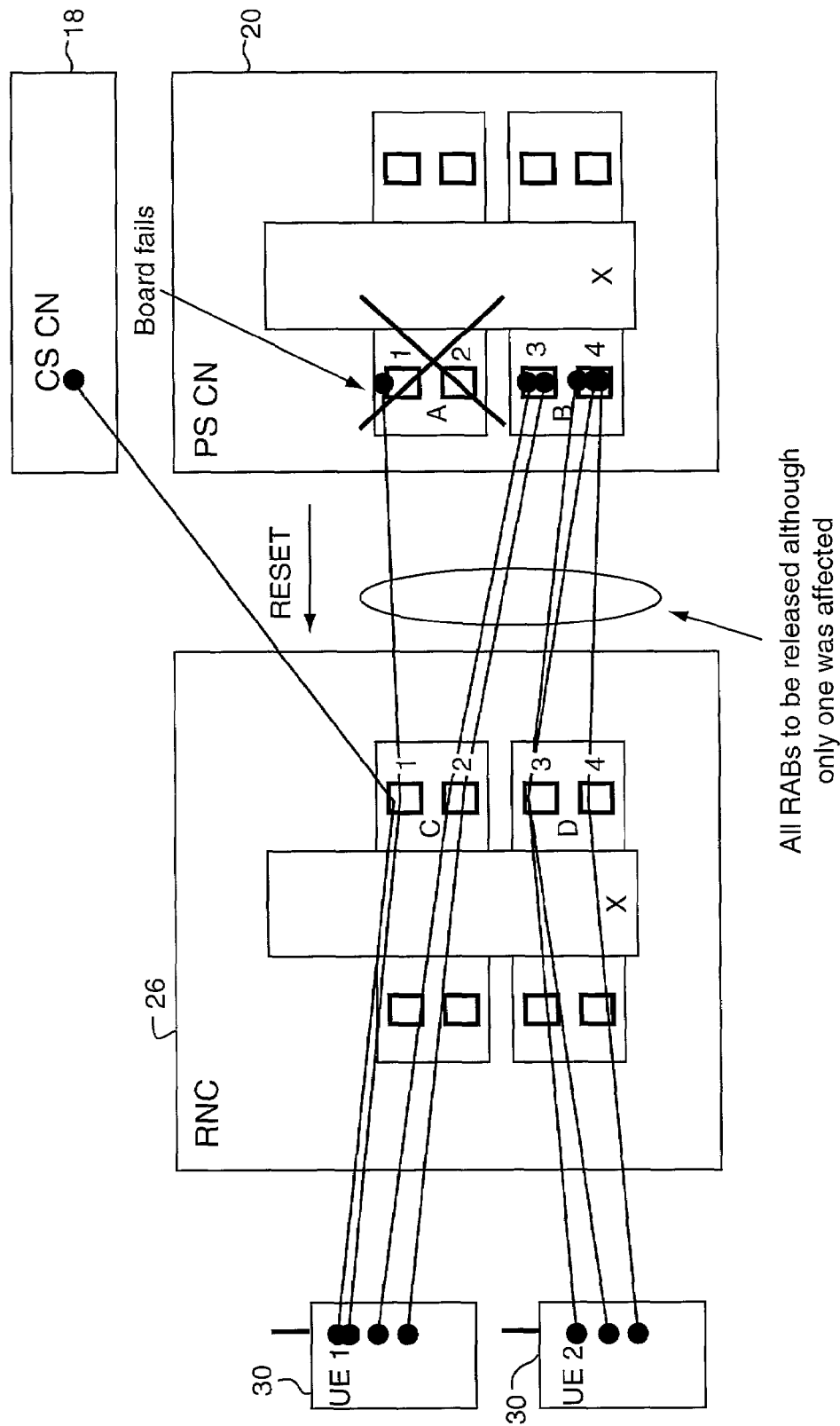
FIGS. 6, 7 and 8 are examples of a failed processor board in which a message is sent from the affected node as a result of that failure.

A first approach to a node failure is to send a RESET message which indicates that all connections associated with that failed node should be released. An example of such a RESET message is a UTRAN Iu Interface RANAP RESET message as defined by the 3GTS 25.413 UTRAN standard. FIG. 6 shows an example of this general reset approach. All RABs associated with the failed PSCN node 20 are released, even though only one RAB is actually affected by the failure. More specifically, after processor board A fails in the PSCN node, a RESET message is sent to the RNC 26. The RESET message indicates that the PSCN node 20 has had a node-wide failure, and as a result, the RNC 26 should release resources (including all RABs and signaling connections) associated with the PSCN node 20. However, the failure in board A only actually impacts one RAB to UE1. Unfortunately, five other RABs to UE1 and UE2, which are not affected by the processor board A failure, are also released. Only the RAB between UE1 and the CSCN remains intact. Since there may be many boards in a node, many RABs would be released for no reason in this kind of node-wide failure message.

Figure 7:
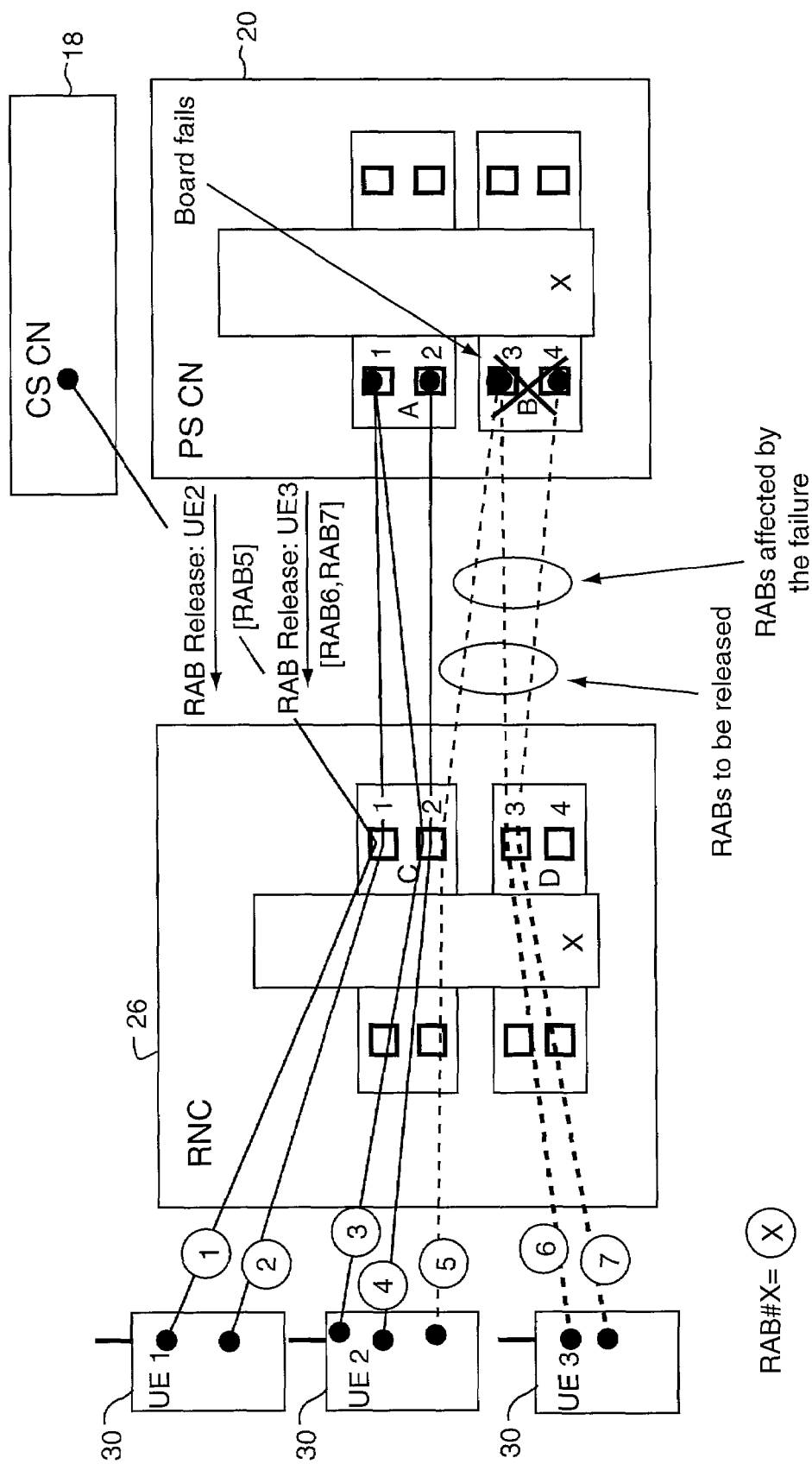

A second approach is to release each affected RAB individually using control signaling, e.g., existing RANAP control signaling. In the example shown in FIG. 7, a processor board B fails, and the RABs marked with dotted lines are lost. Individual RAB Release request messages are sent by the PSCN 20 to the RNC 26 to each UE having a RAB that uses the failed processor board B. A "Release RAB5" message is sent to UE2, and a "Release RAB6 and RAB7" message is sent to UE3. The benefit of this approach is that unaffected RABs are maintained. A drawback is that since there may be many RABs affected by the failed processor board C, a large and immediate signaling burden is placed on the radio and core networks.

Figure 8:
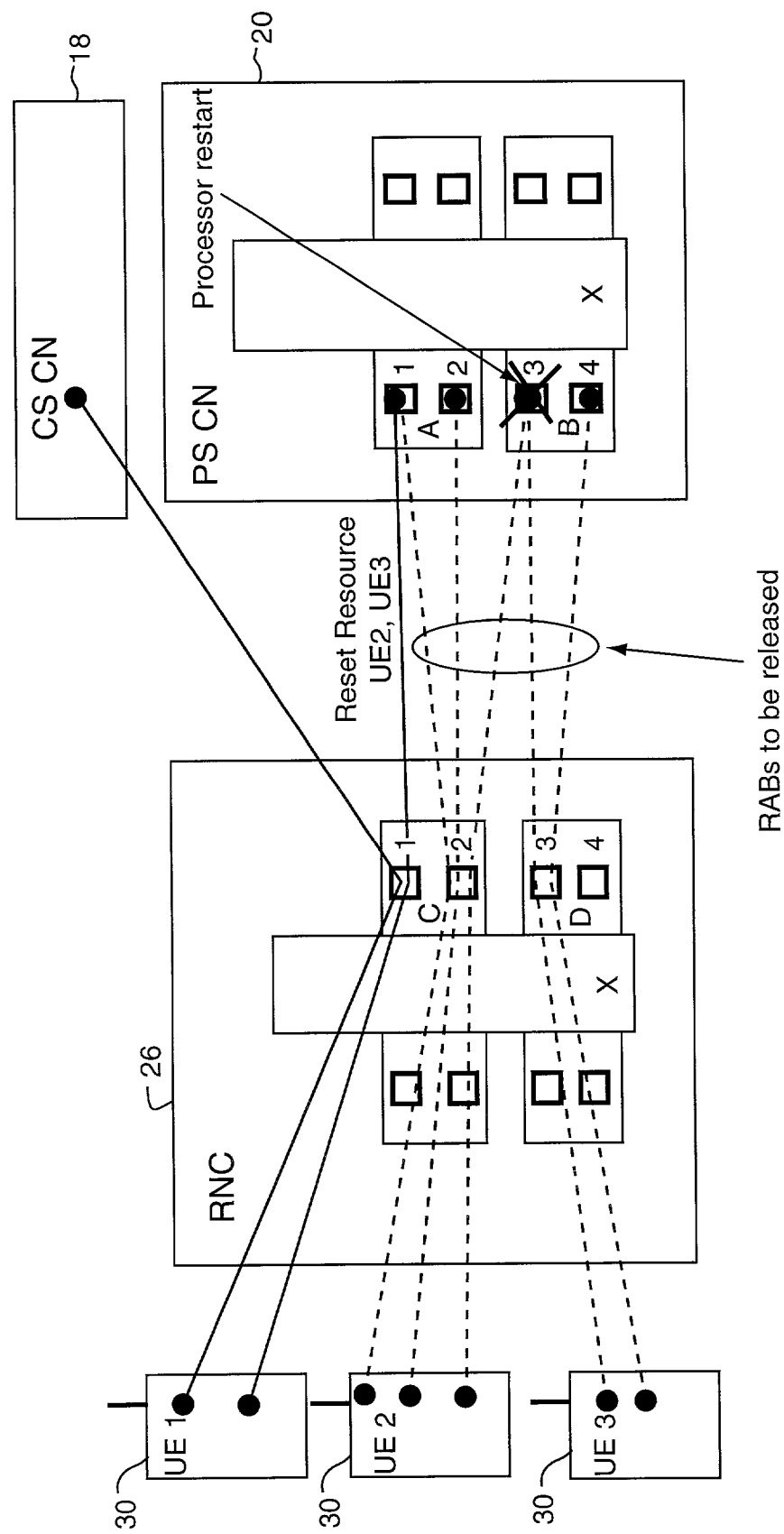

The third approach is to just release affected UEs. Consider the situation illustrated in FIG. 8. When a partial failure, e.g., a processor restart, is detected in processor 3 of processor board B in the PSCN node 20, a single message is sent to the RNC 26 listing all UEs having at least one RAB supported by the failed processor 3. An example of such a message is RESET RESOURCE message in the RANAP protocol. FIG. 8 shows an example: RESET RESOURCE UE2, UE3. When this message is received in the RNC 26, the RNC 26 should release all resources (RABs and signaling connections) of all listed UEs. While this reduces the signaling load, a disadvantage of this affected-UE approach is that unaffected RABs for those UEs are released unnecessarily.

Figure 9:
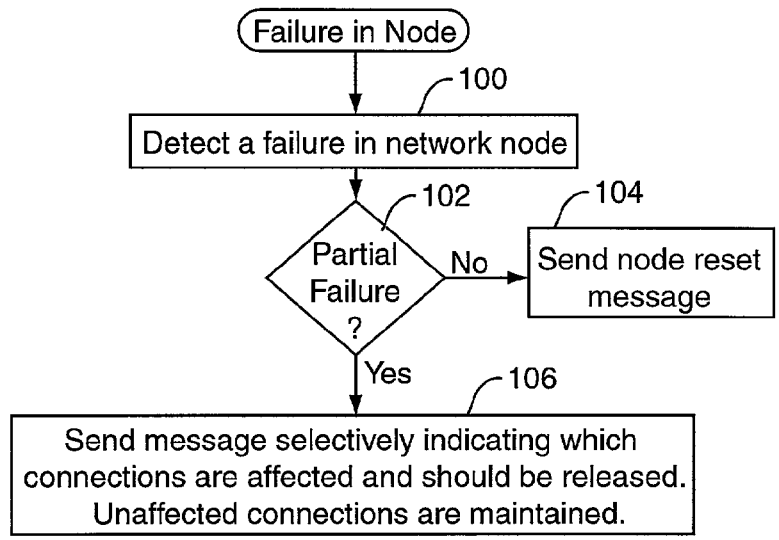
FIG. 9 is a flowchart diagram illustrating procedures in accordance with an example implementation of the invention when an individual processor fails.

None of these three approaches maintain RABs unaffected by a partial failure without causing a significant "release" signaling load. The "Failure in Node" routine outlined in the flowchart of FIG. 9 overcomes these shortcomings. A failure is detected in a network node (step 100). A network failure includes any type of failure that affects the node's ability to support or otherwise render service to a particular connection to a user equipment. Of course, such failures include situations where an entire node is disabled, but they also include any partial failure in the node.

Figure 3:
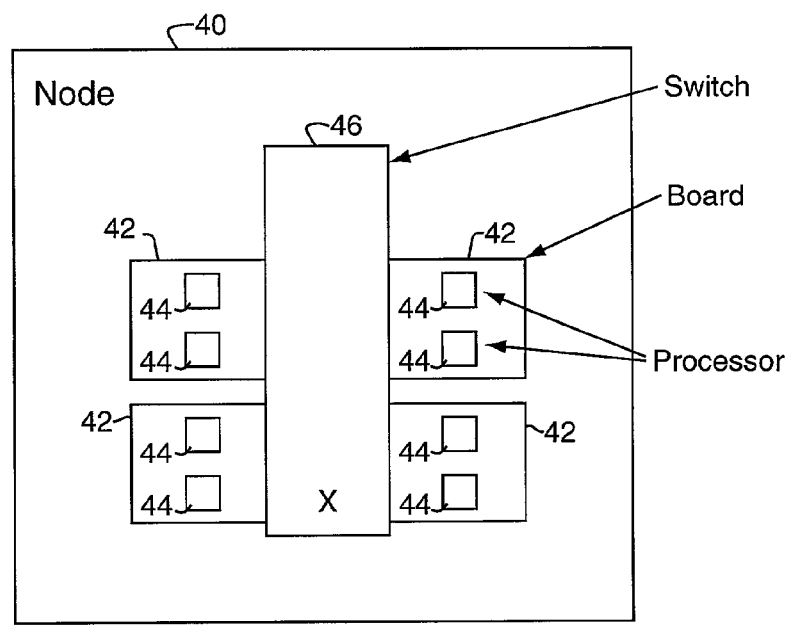
FIG. 3 shows a modular and distributed node architecture that may be employed in one or more of the nodes shown in FIG. 1.
Figure 4:
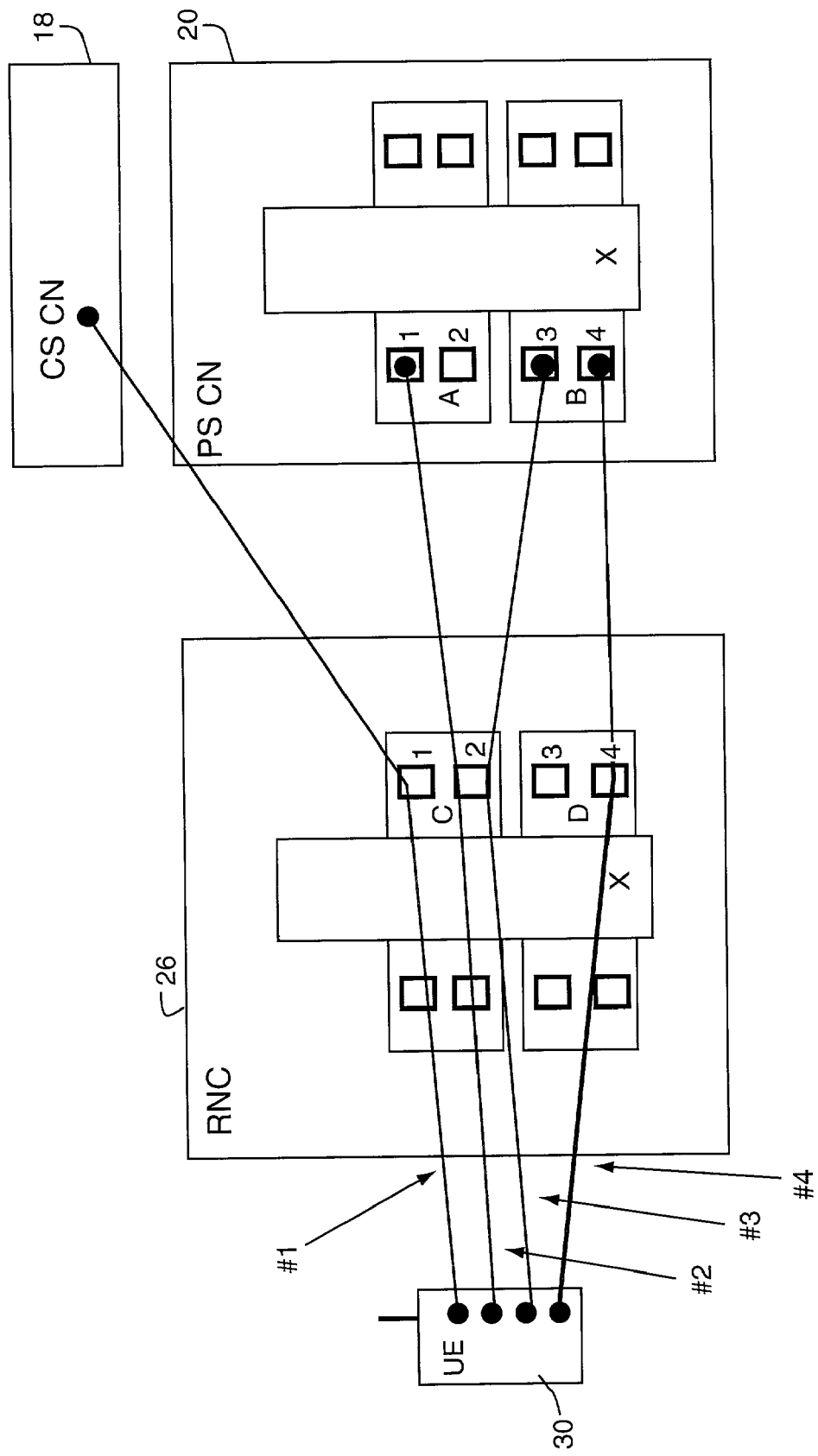
FIG. 4 is an illustration of how four connections to a UE are supported using the node architecture shown in FIG. 3.
Figure 5:
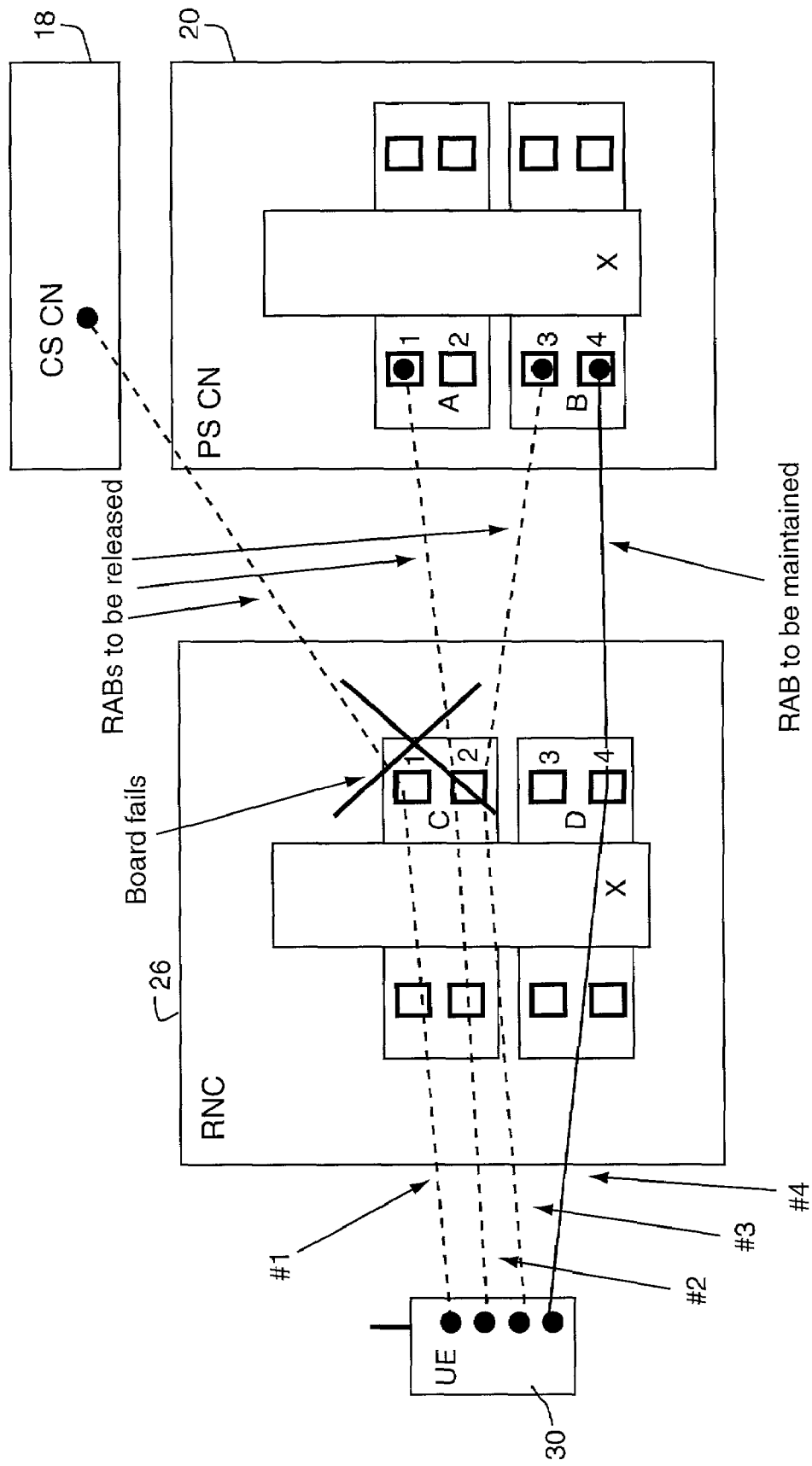
FIG. 5 illustrates an example where one of the processor boards in a node fails, and how that failure impacts connections to the UE.

Assuming the node is configured for example as shown in FIG. 3, one of the processors may detect an error, and therefore, must perform some type of processor restart or error handling operation. As mentioned above, such processors and other devices often have self-detecting mechanisms that detect failures or errors, and send appropriate messages based on the type of failure or error detected. Some other node controller (not shown) may also be employed.

A decision is made in the node whether the failure is a partial failure (block 102). If not, it may be appropriate in some circumstances to assume that the entire node has failed and must be reset. Accordingly, the node sends a reset or similar type message to one or more other nodes such as RNCs, base stations, UEs, and other core network nodes (block 104). If a partial failure is detected in block 102, e.g., one of plural processors is restarted, the node sends a message to one or more nodes that selectively indicates which connections are affected by the failure and should be released. Those connections unaffected by the partial failure are maintained (block 106). Using this approach, unaffected connections are not released unnecessarily. On the other hand, there is no need to send individual messages for each connection that is affected by the partial failure, which keeps the control signaling load to a manageable level.

Figure 10:
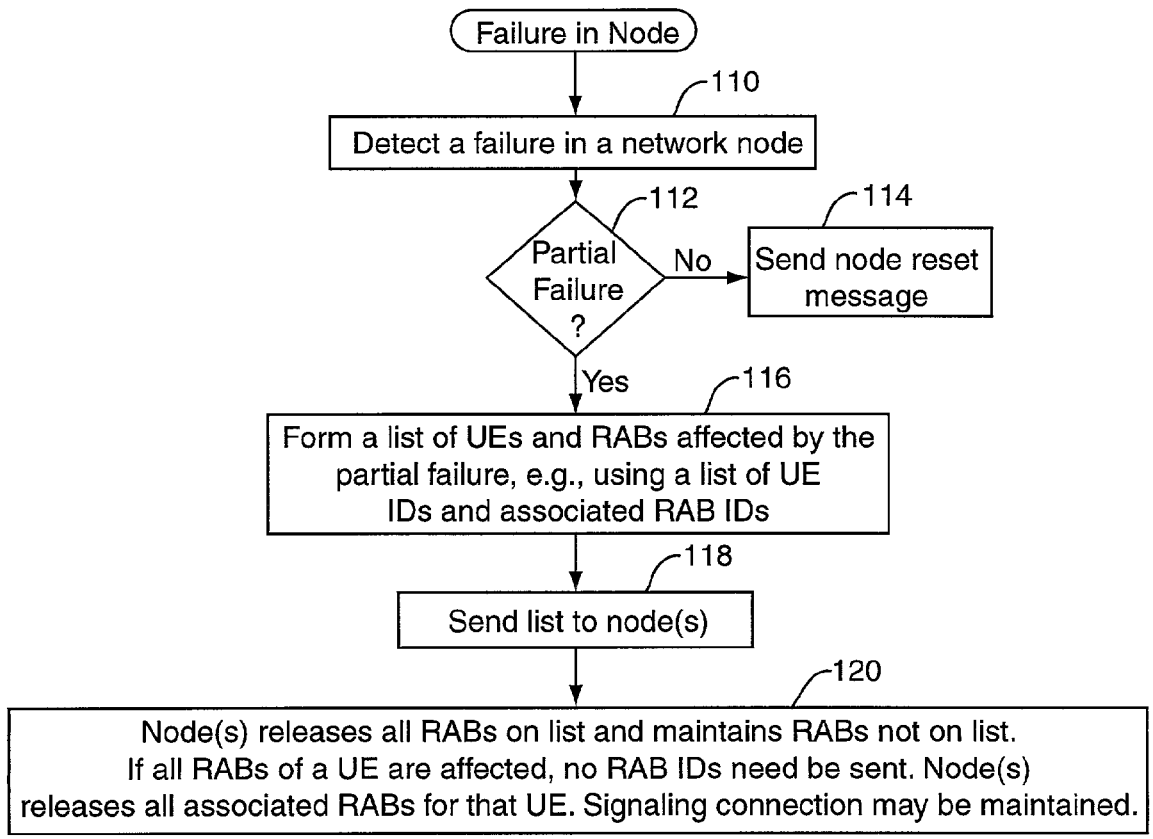
FIG. 10 is a flowchart diagram illustrating procedures in accordance with an example implementation where a node fails.

FIG. 10 employs a specific example of such a message. As with FIG. 9, a failure is detected in a network node (block 110), and a decision is made whether the failure is a partial or complete failure (block 112). If the failure is node-wide, a node reset message is sent to one or more nodes (block 114). On the other hand, for a partial failure, the node forms a list of UEs and connections (in this case radio access bearers) specifically affected by the partial failure. The list could include for example UE identifiers, (e.g., UE's IMSI), and RAB identifiers (block 116). The list is then sent to one or more nodes (block 118).

The list may be sent in an existing message or a new message may be introduced to indicate a partial failure in the node. The one or more nodes that receive the message, release all radio access bearers (RABs) on the list, i.e., all RABs associated with the UE connection, but maintain those RABs to that node that are not listed (block 120). In one variation, if all radio access bearers of a user equipment are affected, no RAB IDs need be sent. Instead, the message sent to the node(s) simply indicates that all associated RABs for a particular UE should be released. In this latter instance, there may be situations where it is desirable to maintain a signaling connection to that user equipment unit, e.g., registration, unless the message specifically indicates that the signaling connection should be released as well.

Figure 11:
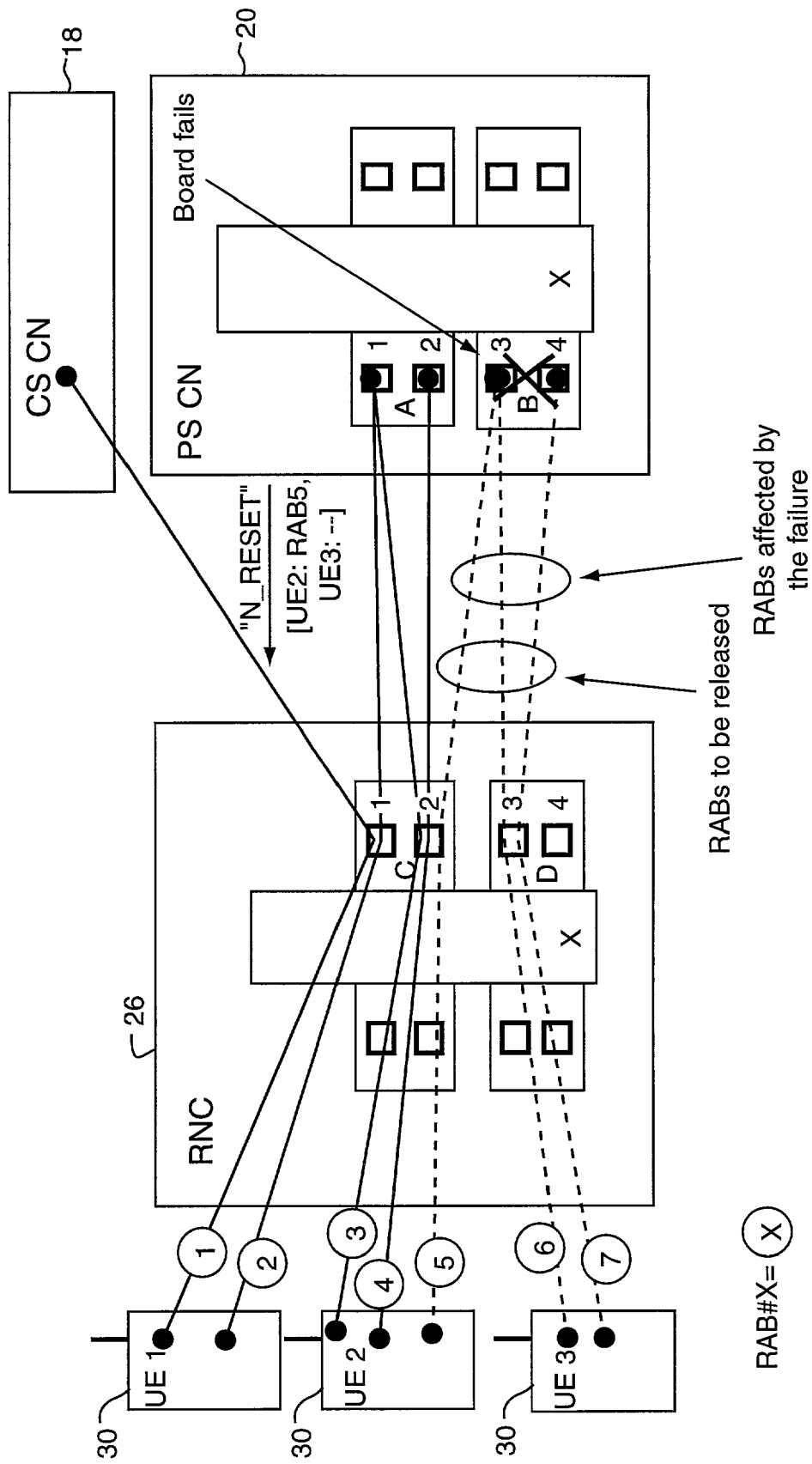
FIG. 11 is a function block diagram illustrating an example where a processor board fails.

Consider the example shown in FIG. 11 where a processor board B fails. Since RABs in UE2 (RAB5) and UE3 (i.e., RAB6 and RAB7) are affected by that failure, the PSCN 20 sends a message, e.g., an "N RESET" message, to the RNC listing these RABs and the IDs of the affected UEs. The RNC 26 then releases these RABs. Since both RABs of UE3, (i.e., RAB6 and RAB7), are affected, the RAB IDs need not be sent to the RNC to be released. The N_RESET message simply indicates that all RABs for UE3 are to be released. Because RAB3 and RAB4 of UE2 are not affected, they are not released. RAB1 and RAB2 for UE1 also remain intact. The N_RESET message is shown only being sent to the RNC for simplicity; however, that message may be sent to one or more base stations, UEs, and/or other core network nodes.

Another example and non-limiting implementation of the invention uses an IP address of the failed device. In IP-capable nodes, a separate IP address may be assigned for each device, e.g., a processor, that handles packet data traffic. When an RAB is set up, the IP address of the allocated device is sent to one or more peer node(s). The peer node(s) then routes the traffic of that to this IP address.

Figure 12:
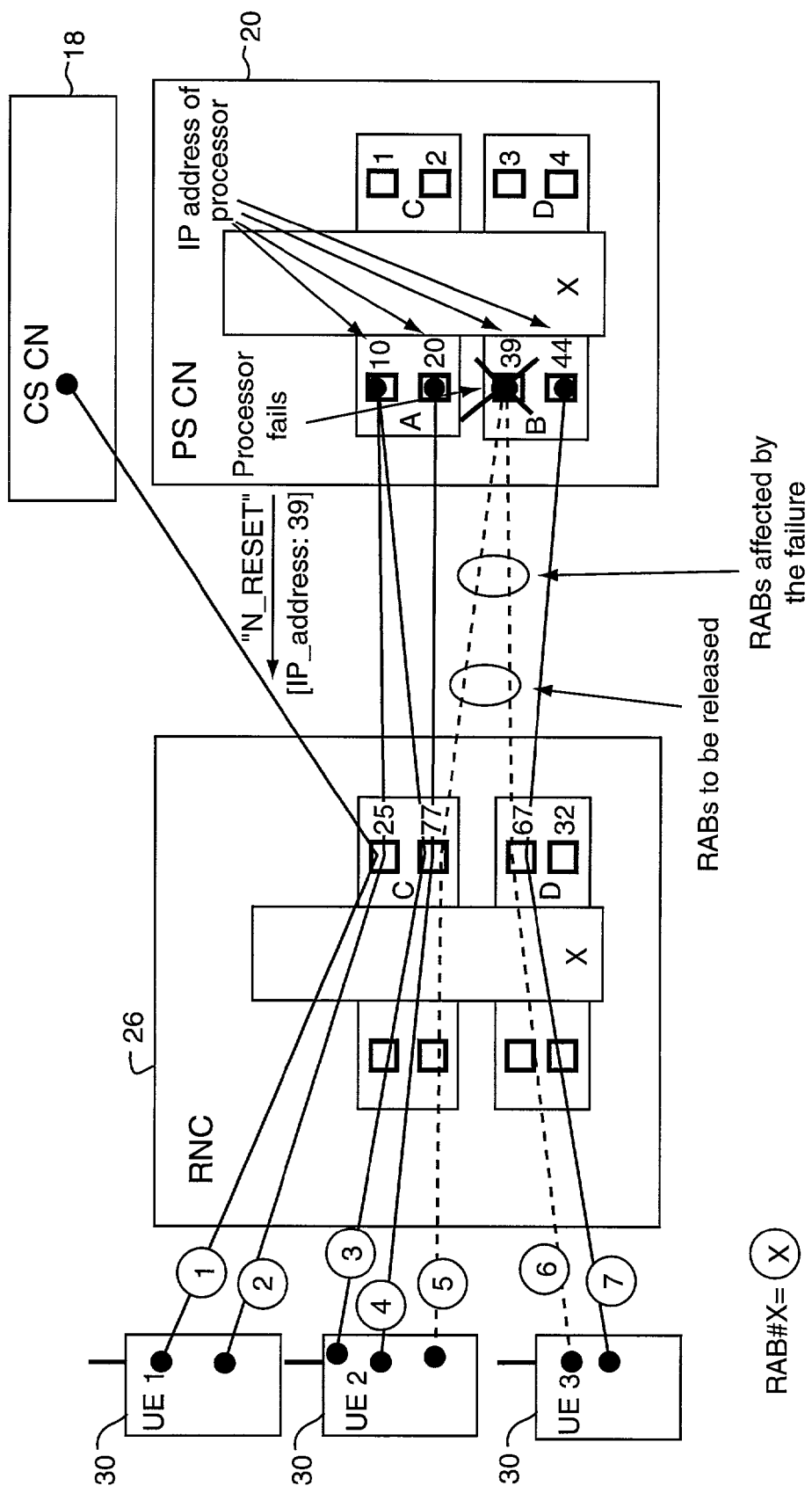
FIG. 12 is an example implementation of the present invention that employs IP addresses of node elements.

Referring to the example shown in FIG. 12, if the processor (IP address 39) fails, the PSCN node 20 sends a message to the RNC 26 with the IP address of the failed processor. The RNC then releases all RABs associated with this IP address. Again, this single message, selective RAB release approach is efficient because of its low signaling load and effective because RABs are not unnecessarily released.

There is typically a signaling connection for each UE between the RNC and UE, the RNC and the PSCN, and the RNC and the CSCN, (e.g., SCCP connections). In accordance with another aspect of the present invention, the connection release message may also include an indication whether the UE signaling connection should be released when an error or a failure is detected that affects the UE. This aspect of the invention may be useful in situations when a fault or error affecting the UE requires all of its RABS to be released, but where it is desirable to maintain the signaling connection between the UE and the radio network. One reason why the signaling connection may be maintained is to permit the UE to update the radio network with its current location. Accordingly, for each UE in the list of affected UEs in the message, an associated signaling connection indicator such as a flag may be set (release the signaling connection) or reset (maintain the signaling connection) in addition to the list of affected RABs. If a list of RABs to be released is included in the message, and there are unlisted RABs to be maintained, the signaling flag is ignored because the UE signaling connection must be maintained for unaffected RABs.

Figure 13:
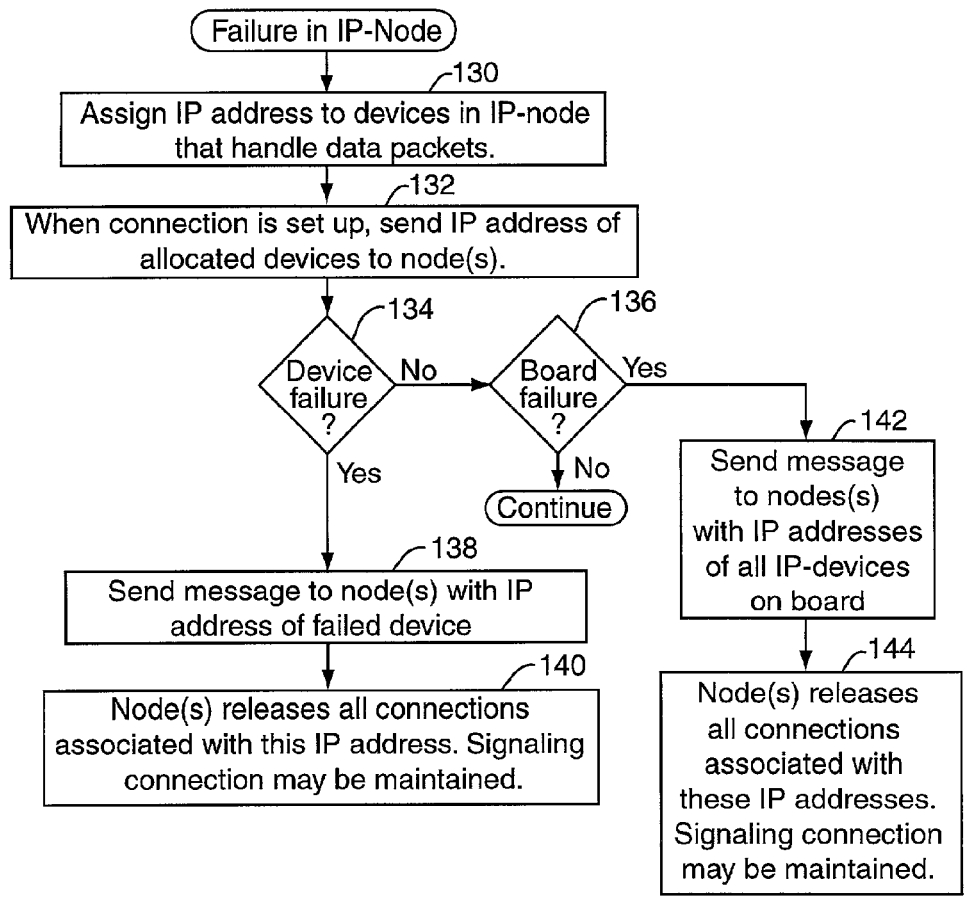
FIG. 13 is a flowchart diagram illustrating example procedures for implementing the example implementation shown in FIG. 12.

A "Failure in IP-Node" routine is now described in conjunction with the flowchart illustrated in FIG. 13. An IP address is assigned to each device in a node that handles data packets (block 130). When a radio access bearer is set up through that node, the node sends the IP addresses of those devices that have been allocated to support the radio access bearer to one or more nodes (block 132). A decision is made whether one of those allocated devices has failed (block 134). If it has, the IP-node sends a message to one or more nodes with the address of the failed device(s) (block 138). The one or more nodes, upon receiving that message, releases all radio access bearers associated with this IP address. However, as just explained, a signaling connection may be maintained if desired or otherwise appropriate (block 140). Whether to maintain the signaling connection for a UE may be indicated with a list of those UEs whose signaling connection is to be released. The signaling connection is maintained for the UEs that are not included in the list.

If a device failure is not detected, a decision is made whether a board in the node, e.g., a processor board, has failed (block 136). If it has, the IP node sends a message to one or more nodes listing the IP addresses of all IP devices that are located on that failed board (block 142). Upon receiving that message, the one or more nodes release all radio access bearers associated with the IP addresses listed in the message. Again, the signaling connection may be maintained (block 144). Whether to maintain the signaling connection for a UE may be indicated with a list of those UEs whose signaling connection is to be released. The signaling connection is maintained for the UEs that are not included in the list.

Figure 14:
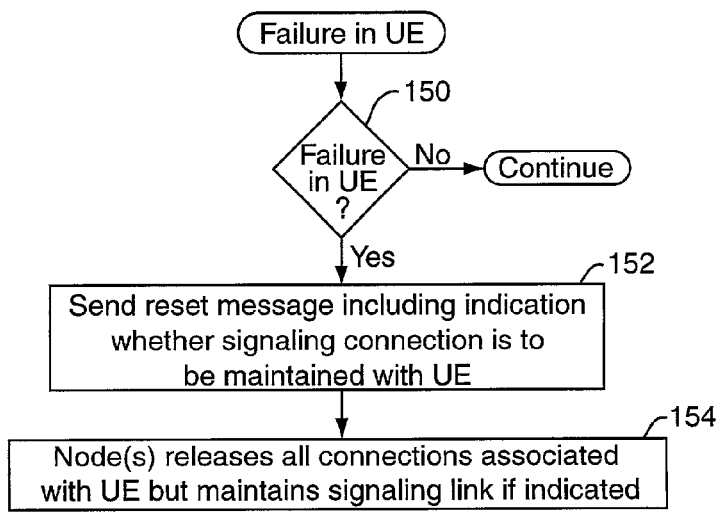
FIG. 14 is an example implementation of the present invention for a failure effected in a UE.

The present invention may be applied to failures detected in a wireless user equipment unit (UE). FIG. 14 illustrates in flowchart format a "Failure in UE" routine. A decision is made in block 150 whether a failure has occurred in the UE. If it has, the UE sends a message indicating whether the signaling connection is to be maintained with the UE (block 152). One or more nodes release all radio access bearers associated with the UE, but maintain the signaling link with the UE, if so indicated (block 154).

Figure 1:
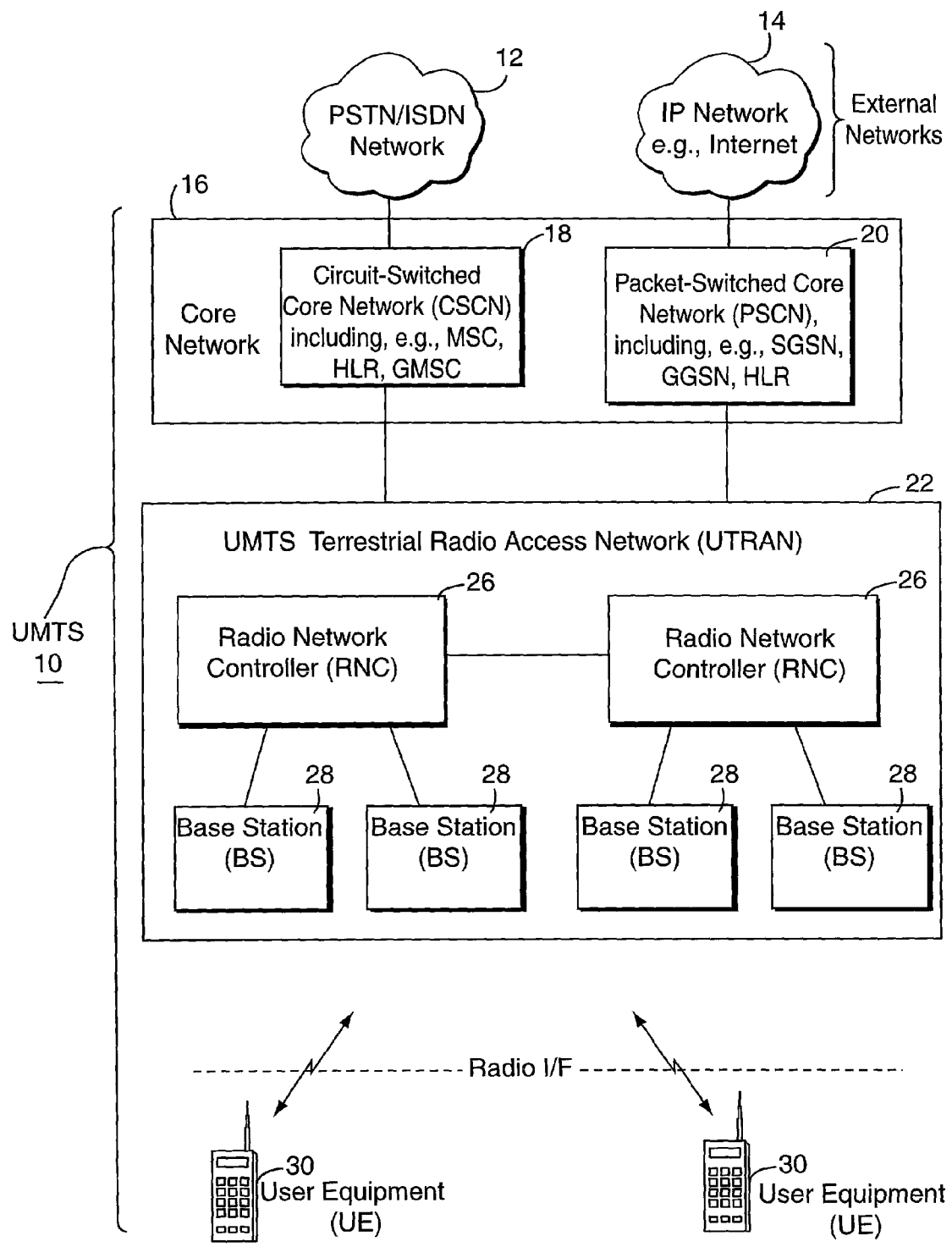
FIG. 1 is a block diagram of a UMTS-type system in which the present invention may be advantageously employed.
Figure 2:
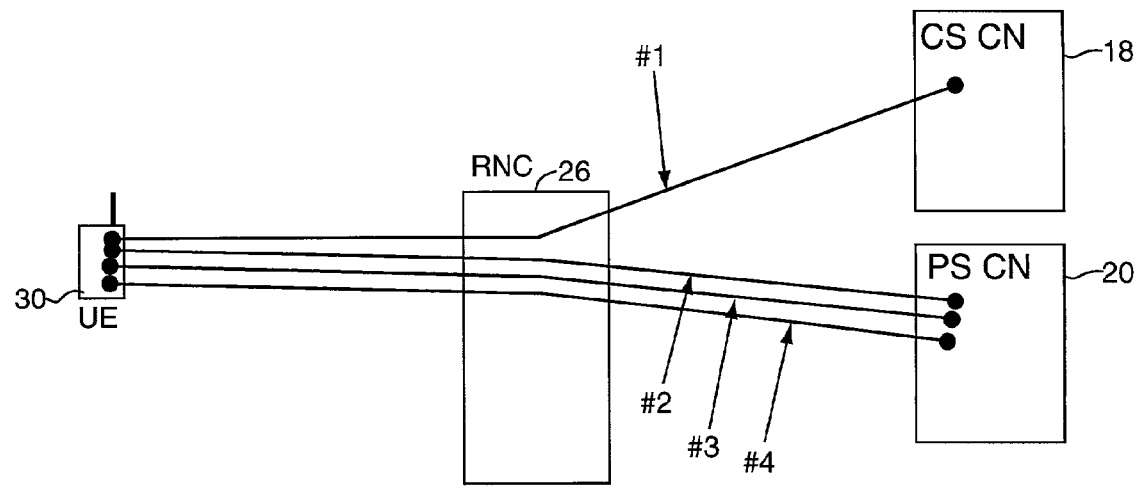
FIG. 2 is a diagram illustrating four connections from two core network nodes to a UE based on the UMTS system shown in FIG. 1.

Thus, in the present invention, if a failure occurs in a node, unaffected connections are maintained, thereby improving the service provided to those users with unaffected connections. Moreover, a large amount of network release signaling is avoided. Of course, the invention is not restricted to the UMTS system and nodes shown in FIG. 1. Indeed, the invention can be employed in any radio communication system that employs plural connections to a communications station. Other non-limiting applications include: the CDMA 2000 system, the GPRS system with SGSN and GGSN nodes, interactions between two routers, etc. In the UMTS system of FIG. 1, the invention may be implemented for interactions between RNC and RBS nodes, between two RNC nodes, between two RBS nodes, between RBS and UE nodes, and between RNC and core network nodes, and between core network nodes.

As explained earlier, the invention may be applied to wireline access network environments as well as radio access network environments. In a wireline communication system, connections are established between an external network and wireline subscriber units (like PCs) by way of a wireline access network, such as a ISP. A failure is detected in a node in the wireline access network, and one or more subscriber unit connections affected by the detected failure are identified. A message identifying the one or more affected wireline subscriber unit connections (or just the affected wireline subscriber units) is sent so that one or more affected wireline subscriber unit connections may be released. Other aspects of the invention described above, e.g., the list structures included in the message, may also be readily applied in this environment.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Therefore, while the present invention is described in relation to a preferred example embodiment, it is to be understood that this disclosure is only illustrative and exemplary of the to present invention. Accordingly, it is intended that the invention be limited only by the claims appended hereto.

What is claimed is:

1. For use in a communication system where connections are established between an external network and users of mobile radio subscriber units by way of a radio access network and each established connection is handled by an associated data processing circuit, a method comprising:
   detecting a failure in a data processing circuit indicating that the data processing circuit is not functioning and thus can no longer handle established connections;
   identifying one or more established mobile radio subscriber unit connections being handled by the failed data processing circuit;
   sending a message to a radio access network node identifying the one or more identified mobile radio subscriber unit connections;
   sending a list to the radio access network node identifying the one or more mobile radio subscriber units affected by the failed data processing circuit no longer functioning;
   wherein the radio access network node is used to establish one or more radio access bearers associated with the one or more identified mobile radio subscriber unit connections,
   wherein each mobile radio subscriber unit connection is active and ongoing, is associated with one or more radio access bearers, and carries information between the mobile radio subscriber unit user and another communicating entity coupled to the external network,
   the method further comprising the radio access network node releasing all subscriber unit connections associated with the one or more mobile radio subscriber units in the list.

2. The method in claim 1, further comprising:
   the radio access network node releasing the one or more mobile radio subscriber unit connections identified in the message because the failed data processing circuit is not functioning.

3. The method in claim 1, further comprising:
   the radio access network node maintaining one or more mobile radio subscriber connections not determined to be handled by the failed data processing circuit.

4. The method in claim 1, further comprising:
   the radio access network node maintaining a signaling connection associated with a mobile radio subscriber unit affected by the failed data processing circuit no longer functioning.

5. The method in claim 1, wherein the mobile radio subscriber unit uses plural connections during a communications session.

6. The method in claim 1, further comprising:
   generating a list identifying the one or more mobile radio subscriber units and one or more mobile radio subscriber unit connections affected by the failed data processing circuit no longer functioning, and wherein the message sent to the radio access network node includes the list.

7. The method in claim 6, further comprising:

indicating in the list whether a signaling connection associated with a mobile radio subscriber unit affected by the failed data processing circuit no longer functioning should be released or maintained.

8. The method in claim 6, wherein the list includes identifiers for the one or more mobile radio subscriber units affected by the failed data processing circuit no longer functioning and for the one or more mobile radio subscriber unit connections affected by the failed data processing circuit no longer functioning.

9. The method in claim 8, wherein when the list does not include connection identifiers, all connections for a mobile radio subscriber unit are released.

10. The method in claim 1, wherein the message is sent using an existing control signaling message.

11. For use in a communication system where connections are established between an external network and users of radio subscriber units by way of a radio access network and each established connection is controlled by an associated data processing device, a method comprising:

detecting a failure in a data processing device in a node where the failed data processing device is no longer functional and thus can no longer control any established connections, and sending a message to a radio access network node identifying the failed data processing device, sending a list to the radio access network node identifying the one or more mobile radio subscriber units affected by the failed data processing circuit no longer functioning; and wherein the radio access network node releases mobile radio subscriber unit connections associated with the identified failed data processing device, wherein the radio access network node is used to establish one or more radio access bearers associated with the one or more identified mobile radio subscriber unit connections, wherein each mobile radio subscriber unit connection is active and ongoing, is associated with one or more radio access bearers, and carries information between the mobile radio user and another communicating entity coupled to the external network.

12. The method in claim 11, further comprising:

assigning a corresponding network address to each of multiple data processing devices in the node, and when a radio subscriber unit connection is established, sending an address for each data processing device associated with the radio subscriber unit connection to one or more other nodes, wherein the message includes the network address of the failed data processing device.

13. The method in claim 12, wherein the network address is an Internet Protocol (IP) address.

14. The method in claim 11, further comprising:

detecting a failure of a board containing plural data processing devices such that none of the data processing devices on the board can control an established connection, wherein the message identifies the addresses of the plural data processing devices on the board, and wherein the radio access network node releases radio unit connections associated with the failed board.

15. The method in claim 11, wherein the message sent to the radio access network node includes the list.

16. For use in a radio communications system providing communications between an external network and radio units, a radio access network that establishes connections between the external network and users of the radio units, comprising:

a radio network control node for communicating with the external network; and a radio base station node coupled to the radio network controller configured to provide a radio interface with plural radio units, wherein at least one of the radio network control and radio base station nodes includes multiple data processing devices, where each established connection is controlled by an associated data processing device, and when a failure is detected in one of the data processing devices such that a failed data processing device is no longer functional and thus can no longer control any established connections, the one node is configured to send a message to an other of the radio network control and radio base station nodes identifying one or more active and ongoing radio unit connections affected by the failure and including a list identifying one or more radio units affected by the detected failure, wherein at least one of the radio network control and radio base station nodes is configured to establish one or more radio access bearers associated with the one or more identified mobile radio unit connections, wherein each connection is active and ongoing, is associated with one or more radio access bearers, and carries information between the radio unit user and another communicating entity coupled to the external network, wherein the other node is configured to release the one or more detected radio unit connections identified in the message.

17. The radio access network in claim 16, wherein the other node is configured to maintain one or more radio connections not determined to be affected by the detected failure.

18. The radio access network in claim 17, wherein the other node is configured to maintain a signaling link associated with a radio unit affected by the detected failure.

19. The radio access network in claim 16, wherein the list includes identifiers for the one or more radio units affected by the detected failure and for the one or more radio unit connections affected by the detected failure.

20. The radio access network in claim 16, wherein when the list does not include connection identifiers, all connections for a radio subscriber unit are to be released.

21. The radio access network in claim 16, wherein the message is a control signaling message.

22. The radio access network in claim 21, wherein the message is sent using an existing radio access network control signaling message.

23. The radio access network in claim 16, wherein the one node sends a message to the radio unit identifying one or more radio unit connections affected by the failure.

24. The radio access network in claim 16, wherein when a failure is detected in the radio unit, the one node is configured to send a message to the other node to release any connections with the radio unit except a control signaling connection.

25. The radio access network in claim 16, wherein the node includes a switch coupled to plural data processing devices.

26. The radio access network in claim 16, wherein the node includes a switch coupled to plural boards, each board containing plural data processing devices.

27. For use in providing communication connections between an external network and a user of a mobile subscriber unit, a core network node coupled to one or more radio access network nodes that communicate with mobile subscriber units over a radio interface, the core network node comprising:

multiple data processing devices for controlling established connections, a controller configured to perform the following tasks:

detect a failure in the one of the data processing devices such that the failed data processing device is no longer functional and thus can no longer control any established connections;

determine one or more active and ongoing mobile subscriber unit connections affected by the detected failure; and send a message to one or more radio access network nodes identifying the one or more affected mobile subscriber unit connections, wherein the one or more radio access network nodes are configured to establish one or more radio access bearers associated with the one or more affected mobile subscriber unit connections, wherein each mobile subscriber unit connection is active and ongoing, is associated with one or more radio access bearers, and carries information between the mobile subscriber unit user and another communicating entity coupled to the external network, wherein the controller is configured (1) to generate a list identifying the one or more mobile subscriber units affected by the detected failure and one or more mobile subscriber unit connections affected by the detected failure and (2) to include the list in the message to the one or more other radio access network nodes, wherein the list is used to release all mobile subscriber unit connections associated with the one or more mobile subscriber units in the list.

28. The network node in claim 27, wherein the list includes identifiers for the one or more mobile subscriber units affected by the detected failure and for the one or more mobile subscriber unit connections affected by the detected failure.

29. The network node in claim 27, wherein the controller is configured to generate a list identifying the one or more mobile subscriber units affected by the detected failure without identifying mobile subscriber unit connections.

30. The network node in claim 29, wherein the controller is configured to indicate in the list whether a signaling connection associated with a mobile subscriber unit affected by the detected failure should be released or maintained.

31. The network node in claim 27, wherein the core network node includes:

a switch coupled to multiple data processing devices.

32. The network node in claim 27, wherein the core network node includes:

plural processor boards coupled to a switch, each processor board having plural associated data processing devices.

33. An access network comprising the core network node claimed in claim 27.

34. For use in a communication system where connections are established between an external network and users of radio subscriber units by way of a radio access network and each established connection is handled by one of multiple data processing circuits in a radio access network node, apparatus in the radio access network node comprising:

means for determining one or more active and ongoing radio subscriber unit connections affected by a failure detected in one of the multiple data processing circuits indicating that the data processing circuit is not functioning and thus can no longer handle established connections, and means for sending a message to a core network node identifying the one or more affected established radio subscriber unit connections that can no longer be handled by the failed data processing device and including a list identifying the one or more mobile radio subscriber units affected by the failed data processing device, wherein each established radio subscriber unit connection is active and ongoing, is associated with one or more radio access bearers established through the radio access network node, and carries information between the radio subscriber unit user and another communicating entity coupled to the external network, means for releasing the one or more affected radio subscriber unit connections identified in the message.

35. A system including the apparatus in claim 34, further comprising:

means for maintaining one or more radio subscriber connections not determined to be affected by the detected failure.

36. A system in claim 34 wherein the radio access network node is a radio network controller and the core network node is an SGSN.

* * * * *

UNITED STATES PATENT AND TRADEMARK OFFICE
CERTIFICATE OF CORRECTION

| | | |
|---|---|---|
| PATENT NO. | : 7,715,837 B2 | Page 1 of 1 |
| APPLICATION NO. | : 09/778960 | |
| DATED | : May 11, 2010 | |
| INVENTOR(S) | : Lehtovirta et al. | |

It is certified that error appears in the above-identified patent and that said Letters Patent is hereby corrected as shown below:

On the Title Page, item (75), under "Inventors", in Column 1, Line 2, delete "Kista" and insert -- Sollentuna --, therefor.

In Column 8, Line 55, delete "RABS" and insert -- RABs --, therefor.

In Column 10, Line 14, after "of the", delete "to".

Signed and Sealed this

Twenty-third Day of November, 2010

David J. Kappos
*Director of the United States Patent and Trademark Office*